F. M. BLAKE.
CAR BRAKE.
APPLICATION FILED APR. 27, 1908.
1,001,499.
Patented Aug. 22, 1911.
Fig. 1.
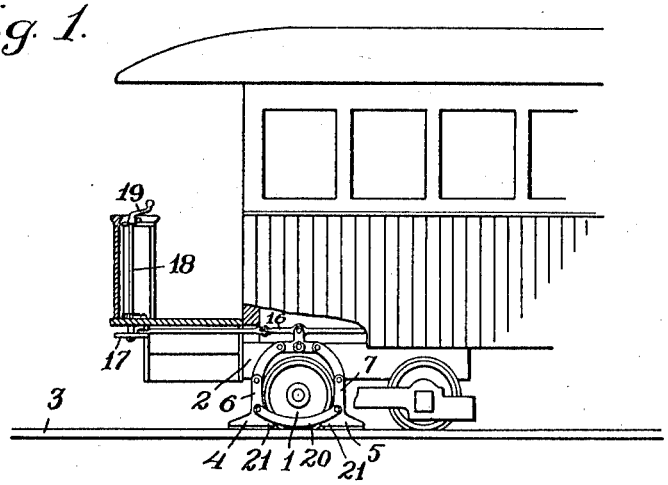
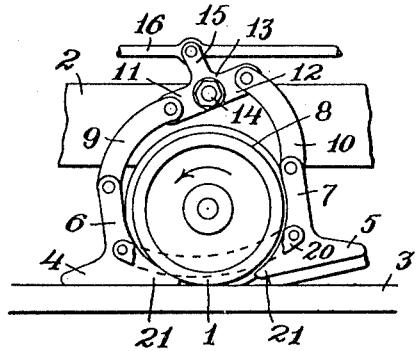
Fig. 2.
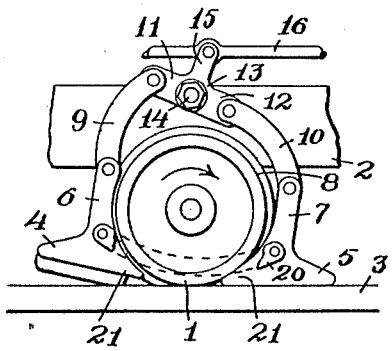
Fig. 3.
Witnesses
Roy D. Tolman
Penelope Bombabach
Inventor
Francis M. Blake.
By Rufus B. Fowler
Attorney

UNITED STATES PATENT OFFICE.

FRANCIS M. BLAKE, OF WORCESTER, MASSACHUSETTS, ASSIGNOR OF ONE-HALF TO ERNEST F. DAKIN, OF WORCESTER, MASSACHUSETTS.

CAR-BRAKE.

1,001,499.  Specification of Letters Patent. Patented Aug. 22, 1911.

Application filed April 27, 1908. Serial No. 429,570.

*To all whom it may concern:*

Be it known that I, FRANCIS M. BLAKE, a citizen of the United States, residing at Worcester, in the county of Worcester and Commonwealth of Massachusetts, have invented a new and useful Improvement in Car-Brakes, of which the following is a specification, accompanied by drawings forming a part of the same, in which—

Figure 1 represents a side elevation of a car truck, having a portion of the car broken away to more clearly disclose the application of my improved brake to one of the car wheels, the brake being shown in its inoperative position. Fig. 2 represents a side view of a car wheel showing a portion of the track and framework of the truck with one of my improved brakes, having one of the brake shoes in operative position as applied when the car wheel is rotating in the direction of the arrow, and Fig. 3 is a similar view showing the application of the brake when the car wheel is rotating in the opposite direction.

Similar reference letters and figures refer to similar parts in the different views.

My invention relates to that class of car brakes in which a brake shoe is applied to the track, and it has for its objects to utilize the momentum of the car and secure a more efficient contact between the brake shoe and the rail; to cause the brake shoe to act as a safety guard in front of the rail and to simplify the construction of this class of brakes.

I accomplish the above objects by means of the construction and arrangement of parts as hereinafter described and pointed out in the annexed claims.

Referring to the accompanying drawings 1 denotes a car wheel, 2 a portion of the framework forming the supporting truck and 3 one of the rails of the track. Applied to the rail 3 on opposite sides of the car wheel are a pair of brake shoes 4 and 5 for integral arms 6 and 7, extending upward on each side of the tread 8 of the car wheel, with their upper ends pivotally connected by links 9 and 10 with the arms 11 and 12 of a three armed lever 13, pivoted at 14 upon the truck and having its third arm 15 pivoted to an operating rod 16, which is connected with any suitable actuating mechanism whereby the three armed lever 13 may be rocked at will. In the present instance, the rod 16 is represented in Fig. 1 as connected with a crank plate 17 on the lower end of a vertical shaft 18, to the upper end of which may be applied a hand wheel or, as shown, a crank lever 19. The brake shoes 4 and 5 are pivotally connected at the base of the upright arms 6 and 7 by means of a link 20. The brake shoes 4 and 5 are, therefore, suspended loosely from the arms 11 and 12 of the three armed lever 13, which is pivoted directly above the axis of the wheel so that the brake shoes will hang upon opposite sides of the wheel and, in their normal position, held out of contact with the tread of the wheel by means of the link 20. In the normal or inoperative position of the brake, the arms 11 and 12 of the three armed lever 13 are maintained in a horizontal position with each of the brake shoes suspended therefrom, with their lower or contacting surfaces horizontal and slightly raised above the upper surface of the rail as represented in Fig. 1.

In their normal position each of the brake shoes is not only out of contact with the rail, but they are prevented from exercising any undue friction upon the tread of the wheel by means of the link 20. The inner corners of each of the brake shoes extend beneath the periphery of the wheel into the triangular spaces inclosed between the tread of the wheel and the upper surfaces of the rail. If it is desired to apply the brake while the car wheel is rotating in the direction of the arrow shown in Fig. 2, the three armed lever 13 is rocked to depress the arm 11 and raise the arm 12, which carries the brake shoe 4 against the track in front of the wheel, with its inner corner 21 wedged between the tread of the wheel and the rail so, that in addition to the force applied to the shoe 4 by rocking the three armed lever 13, the shoe will also be crowded against the rail by the rotating wheel so that the momentum of the car tends to check its movement. If, on the other hand, the wheel is rotated in the direction of the arrow shown in Fig. 3, then the brake is applied by depressing the arm 12 and elevating the arm 11 of the three armed lever, causing the brake shoe 4 to be raised and the brake shoe 5 to become wedged between the wheel and rail with similar result. The rocking of the three armed lever in either direction, therefore, carries one or the other of the shoes into frictional contact with the rail, while the opposite or raised shoe will be brought out of contact with the periphery of the wheel, for example, when the shoe 4 is carried against the rail, as shown in Fig. 2, the shoe 5 will be lifted and carried out of frictional contact with the tread of the wheel, so that a retarding effect is secured by the pressure of one brake shoe against the rail while wedged against the wheel. While the brake shoes are held in their normal or inoperative position, or when the wheel is rotating in the direction indicated in Fig. 2, the brake shoe 4 serves as a safety guard in front of the wheel to prevent objects from passing beneath the wheel. Similarly, the brake shoe 5 serves as a guard when in its normal position, or when the wheel is rotating in the direction indicated in Fig. 3.

I claim,

1. In a car brake, the combination with a car wheel, of a pair of brake shoes on opposite sides of the tread of said wheel, means for pivotally suspending each of said shoes from a single point above the wheel, and means for depressing either of said shoes into contact with the track.

2. In a car brake, the combination with a car wheel, of a three armed lever pivoted above the wheel, links pivoted to two of said arms, brake shoes suspended from said links on opposite sides of the wheel, a spacing link between said shoes, and means for rocking said lever.

3. A brake for a car wheel comprising a brake shoe suspended in front of the wheel from a pivot directly above the wheel, said brake shoe normally held out of contact with said wheel and track, and means for lowering said shoe into contact with the track and for exerting a downward pressure from said pivot upon said shoe to hold it in frictional contact with said track before said shoe is in contact with said wheel.

4. A brake for a car wheel comprising a brake shoe pivotally suspended in front of the wheel, means for holding said shoe normally out of contact with the wheel and track, and means for exerting at will a sufficient downward pressure upon said shoe to hold it in frictional contact with the track and check the forward movement of said shoe to bring it into contact with the wheel.

5. A brake for a car wheel comprising a pair of brake shoes pivotally suspended on opposite sides of the wheel and above the track, a rod parallel with the track, levers connecting said rod and said brake shoes arranged to hold said brake shoes normally out of contact with said wheel and track, and by the longitudinal movement of said rod to lower one of said brake shoes into contact with the track and to exert a downward pressure upon it before it is in contact with the wheel and at the same time to raise the other brake shoe.

Dated this 22nd day of April 1908.

FRANCIS M. BLAKE.

Witnesses:
PENELOPE COMBERBACH,
HENRY WOOD FOWLER.

---

Copies of this patent may be obtained for five cents each, by addressing the "Commissioner of Patents, Washington, D. C."